United States Patent
Hansen et al.

(10) Patent No.: US 7,583,827 B2
(45) Date of Patent: Sep. 1, 2009

(54) ASSESSMENT OF LESIONS IN AN IMAGE

(75) Inventors: Johan Doré Hansen, Nærum (DK);
Michael Grunkin, Skodsborg (DK);
Niels Vaever Hartvig, Hørsholm (DK);
Jannik Godt, Gentofte (DK); Per Rønsholt Andresen, Lynge (DK); Ebbe Sørensen, Lyngby (DK); Soffia Björk Smith, Copenhagen (DK)

(73) Assignee: Retinalyze Danmark A/S, Copenhagen (DK)

( * ) Notice: Subject to any disclaimer, the term of this patent is extended or adjusted under 35 U.S.C. 154(b) by 880 days.

(21) Appl. No.: 10/491,746

(22) PCT Filed: Oct. 3, 2002

(86) PCT No.: PCT/DK02/00661
§ 371 (c)(1), (2), (4) Date: Aug. 11, 2004

(87) PCT Pub. No.: WO03/030074
PCT Pub. Date: Apr. 10, 2003

(65) Prior Publication Data
US 2004/0258285 A1     Dec. 23, 2004

(30) Foreign Application Priority Data
Oct. 3, 2001 (DK) ............................. 2001 01451
Apr. 25, 2002 (DK) ............................ 2002 00635

(51) Int. Cl.
G06K 9/00 (2006.01)
(52) U.S. Cl. .................................................. 382/128
(58) Field of Classification Search ......... 382/128–134, 382/100; 600/300
See application file for complete search history.

(56) References Cited

U.S. PATENT DOCUMENTS

| 5,740,268 A | | 4/1998 | Doi et al. |
| 6,053,865 A | * | 4/2000 | Sugiyama et al. ........... 600/300 |
| 7,106,893 B2 | * | 9/2006 | Bankman et al. ............ 382/128 |

FOREIGN PATENT DOCUMENTS

| JP | 62-280970 A | 12/1987 |
| JP | 09-149901 A | 6/1997 |
| WO | WO 00/65982 A1 | 11/2000 |
| WO | WO 03/030075 A1 | 4/2003 |
| WO | WO 03/030101 A2 | 4/2003 |

OTHER PUBLICATIONS

Lee et al., "A General Algorithm for Recognizing Small, Vague, and Imager-Alike Objects in a Nonuniformly Illuminated Medial Diagnositc Image", vol. 2, Nov. 1, 1998, pp. 941-943.

(Continued)

*Primary Examiner*—Matthew C Bella
*Assistant Examiner*—Claire Wang
(74) *Attorney, Agent, or Firm*—Birch, Stewart, Kolasch & Birch

(57) ABSTRACT

The present invention relates to a method for assessing the presence or absence of lesion(s) in an image and a system therefor, wherein said image may be any image potentially comprising lesions, in particular an image from medical image diagnostics, and more particularly an ocular fundus image. The lesions are identified from starting points being candidate lesion areas and validated with respect to their visibility as compared to the local surroundings.

41 Claims, 8 Drawing Sheets

OTHER PUBLICATIONS

Figure 1:
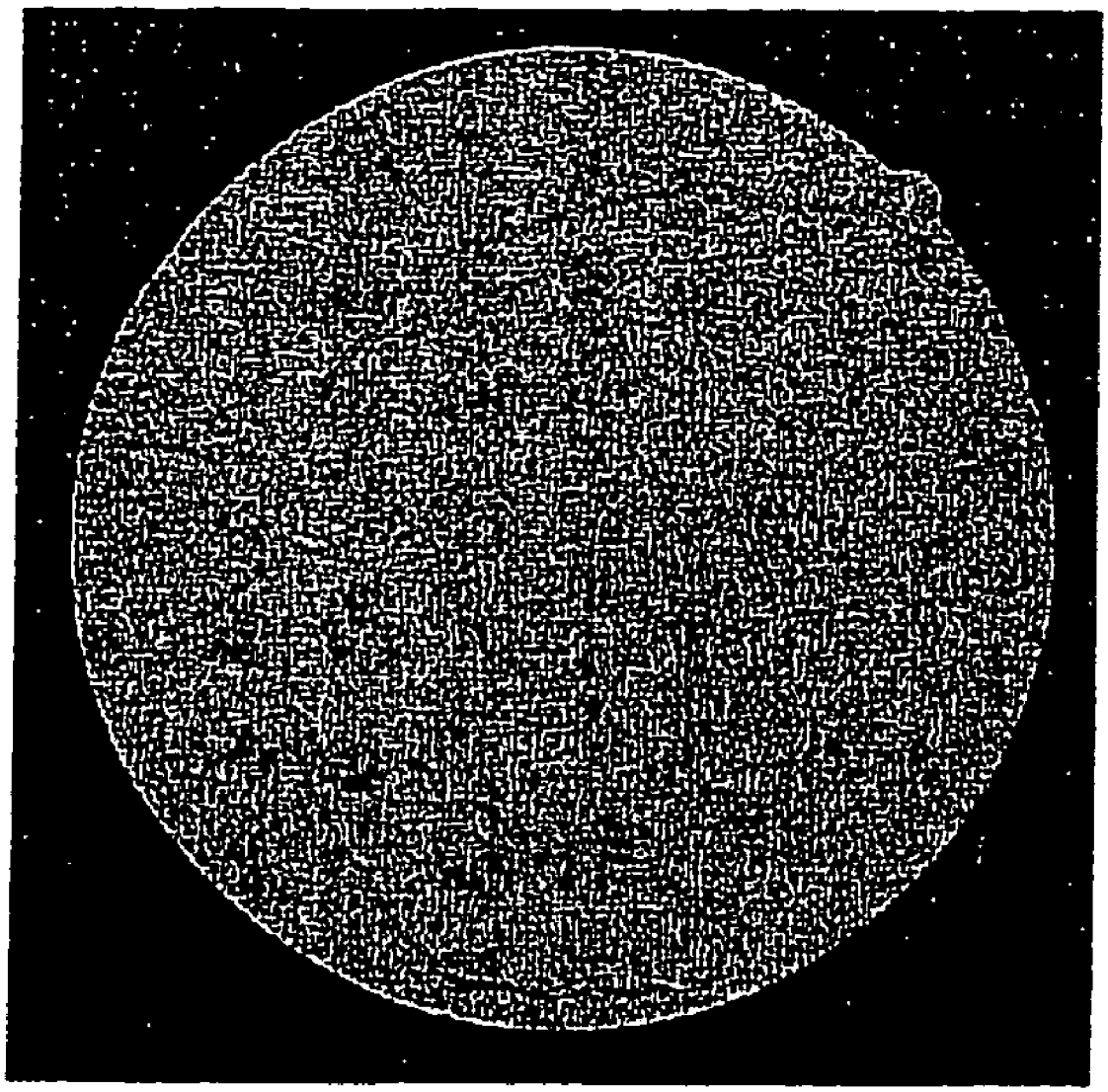

Cain et al., "Visible Lesion Threshold Dependence on Retinal Spot Size for Femtosecond Laser Pulses", Journal of Laser Applications, Jun. 2001, vol. 13, No. 3, pp. 125-131.

Chaudhuri et al., IEEE Transactions on Medical Imaging, vol. 8, No. 3, pp. 263-269, (1989).

Tolias et al., IEEE Transactions on Medical Imaging, vol. 17, No. 2, pp. 263-273, (1998), ISSN:0278-0062.

Akita et al., Pattern Recognition, vol. 15, No. 6, pp. 431-443, (1982), ISSN: 0031-3203 Chapter 4.

Lee et al., IEEE, vol. 2, pp. 941-943, (Nov. 1, 1998), XP-002140433.

Cain et al., Journal of Laser Applications, vol. 13, No. 3, pp. 125-131, (Jun. 2001), XP008009102.

* cited by examiner

ASSESSMENT OF LESIONS IN AN IMAGE

The present invention relates to a method for assessing the presence or absence of lesion(s) in an image and a system therefor, wherein said image may be any image potentially comprising lesions, in particular an image from medical image diagnostics, and more particularly an ocular fundus image.

BACKGROUND

Fundus image analysis presents several challenges, such as high image variability, the need for reliable processing in the face of nonideal imaging conditions and short computation deadlines. Large variability is observed between different patients—even if healthy, with the situation worsening when pathologies exist. For the same patient, variability is observed under differing imaging conditions and during the course of a treatment or simply a long period of time. Besides, fundus images are often characterized by having a limited quality, being subject to improper illumination, glare, fadeout, loss of focus and artifacts arising from reflection, refraction, and dispersion.

Automatic extraction and analyzation of the vascular tree of fundus images is an important task in fundus image analysis for several reasons. First of all the vascular tree is the most prominent feature of the retina, and it is present regardless of health condition. This makes the vascular tree an obvious basis for automated registration and montage synthesis algorithms. Besides, the task of automatic and robust localization of the optic nerve head and fovea, as well as the task of automatic classification of veins and arteries in fundus images may very well rely on a proper extraction of the vascular tree. Another example is the task of automatically detecting lesions which in many cases resemble the blood vessels. A properly extracted vessel tree may be a valuable tool in disqualifying false positive responses produced by such an algorithm, thus increasing its specificity. Finally the vessels often display various pathological manifestasions themselves, such as increased tortuosity, abnormal caliber changes and deproliferation. An automatic vessel tracking algorithm would be the obvious basis for analysis of these phenomena as well. Diabetes is the leading cause of blindness in working age adults. It is a disease that, among its many symptoms, includes a progressive impairment of the peripheral vascular system. These changes in the vasculature of the retina cause progressive vision impairment and eventually complete loss of sight. The tragedy of diabetic retinopathy is that in the vast majority of cases, blindness is preventable by early diagnosis and treatment, but screening programs that could provide early detection are not widespread.

Promising techniques for early detection of diabetic retinopathy presently exist. Researchers have found that retinopathy is preceded by visibly detectable changes in blood flow through the retina. Diagnostic techniques now exist that grade and classify diabetic retinopathy, and together with a series of retinal images taken at different times, these provide a methodology for the early detection of degeneration. Various medical, surgical and dietary interventions may then prevent the disease from progressing to blindness.

Despite the existing techniques for preventing diabetic blindness, only a small fraction of the afflicted population receives timely and proper care, and significant barriers separate most patients from state-of-the art diabetes eye care. There are a limited number of ophthalmologists trained to evaluate retinopathy, and most are located in population centers. Many patients cannot afford the costs or the time for travel to a specialist. Additionally, cultural and language barriers often prevent elderly, rural and ethnic minority patients from seeking proper care. Moreover, because diabetes is a persistent disease and diabetic retinopathy is a degenerative disease, an afflicted patient requires lifelong disease management, including periodic examinations to monitor and record the condition of the retina, and sustained attention on the part of the patient to medical or behavioral guidelines. Such a sustained level of personal responsibility requires a high degree of motivation, and lifelong disease management can be a significant lifestyle burden. These factors increase the likelihood that the patient will, at least at some point, fail to receive proper disease management, often with catastrophic consequences.

Accordingly, it would be desirable to implement more widespread screening for retinal degeneration or pathology, and to positively address the financial, social and cultural barriers to implementation of such screening. It would also be desirable to improve the efficiency and quality of retinal evaluation.

Hence, a precise knowledge of both localisation and orientations of the strucutures of the fundus is important, including the localisation of the vessels. Currently, examination of fundus images is carried out principally by a clinician examining each image "manually". This is not only very time-consuming, since even an experienced clinician can take several minutes to assess a single image, but is also prone to error since there can be inconsistencies between the way in which different clinicians assess a given image. It is therefore desirable to provide ways of automating the process of the analysis of fundus images, using computerised image analysis, so as to provide at least preliminary screening information and also as an aid to diagnosis to assist the clinician in the analysis of difficult cases.

Next, it is generally desirable to provide a method of accurately determining, using computerised image analysis techniques, the position of both the papilla (the point of exit of the optic nerve) and the fovea (the region at the centre of the retina, where the retina is most sensitive to light), as well as vessels of the fundus.

SUMMARY OF THE INVENTION

The present invention relates to a method for detecting lesions in an image, wherein said image comprises a plurality of vessels. The image may be an image of any subject comprising vessels. In particular the method relates to image diagnostics in medicine, such as X-rays, scanning images, photos, magnetic nuclear radiation scanning, CT scannings, as well as other images potentially comprising lesions.

In order to be able to make automatic detection of various structures in fundus images a reliable method of detecting lesions in fundus images actually containing the lesions, and reliably not detecting lesions in other images not comprising lesions. Current methods may be able to detect the lesions in many images, but the methods are not reliable when applied to images not containing lesions.

Furthermore, the method should be robust in the sense that it should be applicable to a wide variety of images independent of illumination, presence of symptoms of diseases and/or artefacts of the image. Lesions may be any sign of disease or pathological condition that is detectable as local events in the image.

A very important aspect of the invention is the detection of any lesions of the fundus. Lesions of the retina normally embrace microaneurysms and exudates, which show up on fundus images as generally "dot shaped" (i.e. substantially circular) areas. It is of interest to distinguish between such microaneurysms and exudates, and further to distinguish them from other lesions or pathologies in the image, such as "cotton wool spots" and hemorrhages.

Accordingly, the present invention relates to a method for assessing the presence or absence of lesion(s) in an image comprising
  a) estimating at least one subset of the image, whereby each subset is a candidate lesion area having a visibility, and estimating the background variation of the image in an area surrounding the candidate lesion area,
  b) correcting the visibility of the candidate lesion area with the background variation, comparing the corrected visibility with a predetermined visibility threshold for lesions in that area, or correcting a predetermined visibility threshold with the background variation, comparing the visibility of the candidate lesion area with the corrected predetermined visibility threshold,
  c) classifying the candidate lesion area detected in a) with respect to the threshold obtained in step b) as a lesion or not,
  d) optionally repeating steps a) to c) until all candidate lesion areas have been classified.

By the method the lesions detected are corrected with respect to the background, in particular the local background in the vicinity of the lesion, in order to be able to detect lesions independent on the background in the specific image, including variations of background in the images, for example due to varying illumination of the various parts of the image.

Another aspect of the invention relates to the establishment of the candidate lesion area, by a method for assessing the presence or absence of lesion(s) in an image, comprising
  a) establishing at least one starting point representative for a lesion in the image,
  b) selecting at least one starting point, estimating a subset of the image corresponding to a candidate lesion by growing q isocurves around the starting point, q being an integer of at least 1, until the periphery of the candidate lesion is established, the isocurves being grown from a vector of one or more visibility features,
  c) determining the visibility of the candidate lesion area, the visibility being determined from a visibility feature different from the visibility features used for growing in step b), and comparing the visibility of the candidate lesion with a predetermined threshold,
  d) classifying the candidate lesion area detected in a) with respect to the threshold obtained in step b) as a lesion or not,
optionally repeating steps b) to d) until all candidate lesion areas have been classified.

By this aspect the candidate lesion area(s) is/are grown as isocurves from a starting point, and the starting point may be adjusted to naturally occurring structures in the image, such as vessels and optic nerve head.

Furthermore, the invention relates to a system for carrying out the methods according to the invention, such as
a system for assessing the presence or absence of lesion(s) in an image, comprising
  a) an algorithm for estimating at least one subset of the image, whereby each subset is a candidate lesion area having a visibility, and estimating the background variation of the image in an area surrounding the candidate lesion area,
  b) an algorithm for correcting the visibility of the candidate lesion area with the background variation, comparing the corrected visibility with a predetermined visibility threshold for lesions in that area, or correcting a predetermined visibility threshold with the background variation, comparing the visibility of the candidate lesion area with the corrected predetermined visibility threshold,
  c) an algorithm for classifying the candidate lesion area detected in a) with respect to the threshold obtained in step b) as a lesion or not,
  d) an algorithm for optionally repeating steps a) to c) until all candidate lesion areas have been classified.

as well as
a system for assessing the presence or absence of lesion(s) in an image, comprising
  a) an algorithm for establishing at least one starting point representative for a lesion in the image,
  b) an algorithm for selecting at least one starting point, estimating a subset of the image corresponding to a candidate lesion by growing q isocurves around the starting point, q being an integer of at least 1, until the periphery of the candidate lesion is established, the isocurves being grown from a vector of one or more visibility features,
  c) an algorithm for determining the visibility of the candidate lesion area, the visibility being determined from a visibility feature different from the visibility features used for growing in step b), and comparing the visibility of the candidate lesion with a predetermined threshold,
  d) an algorithm for classifying the candidate lesion area detected in a) with respect to the threshold obtained in step b) as a lesion or not,
  e) an algorithm for optionally repeating steps b) to d) until all candidate lesion areas have been classified.

Said systems are capable of incorporating any of the variations of the methods described herein.

Also, the invention relates to a method for diagnosing the presence or absence of a disease in an individual from a fundus image of at least one eye of said individual comprising
  assessing the presence or absence of at least one lesion by the method as defined above,
  grading the fundus image with respect to number and/or size and/or placement of lesions,
  diagnosing the presence or absence of the disease.

The image may then be classified depending of size and/or numbers and/or placement of lesions in the image, and accordingly, the invention relates to a method for classifying a fundus image comprising
  assessing the presence or absence of at least one lesion by the method as defined above,
  grading the fundus image with respect to number and/or size and/or placement of lesions,
  classifying the fundus image into at least two classes.

All the methods described herein are preferably for use in an automatic method, for example as included in a computer readable program.

DRAWINGS

Figure 2:
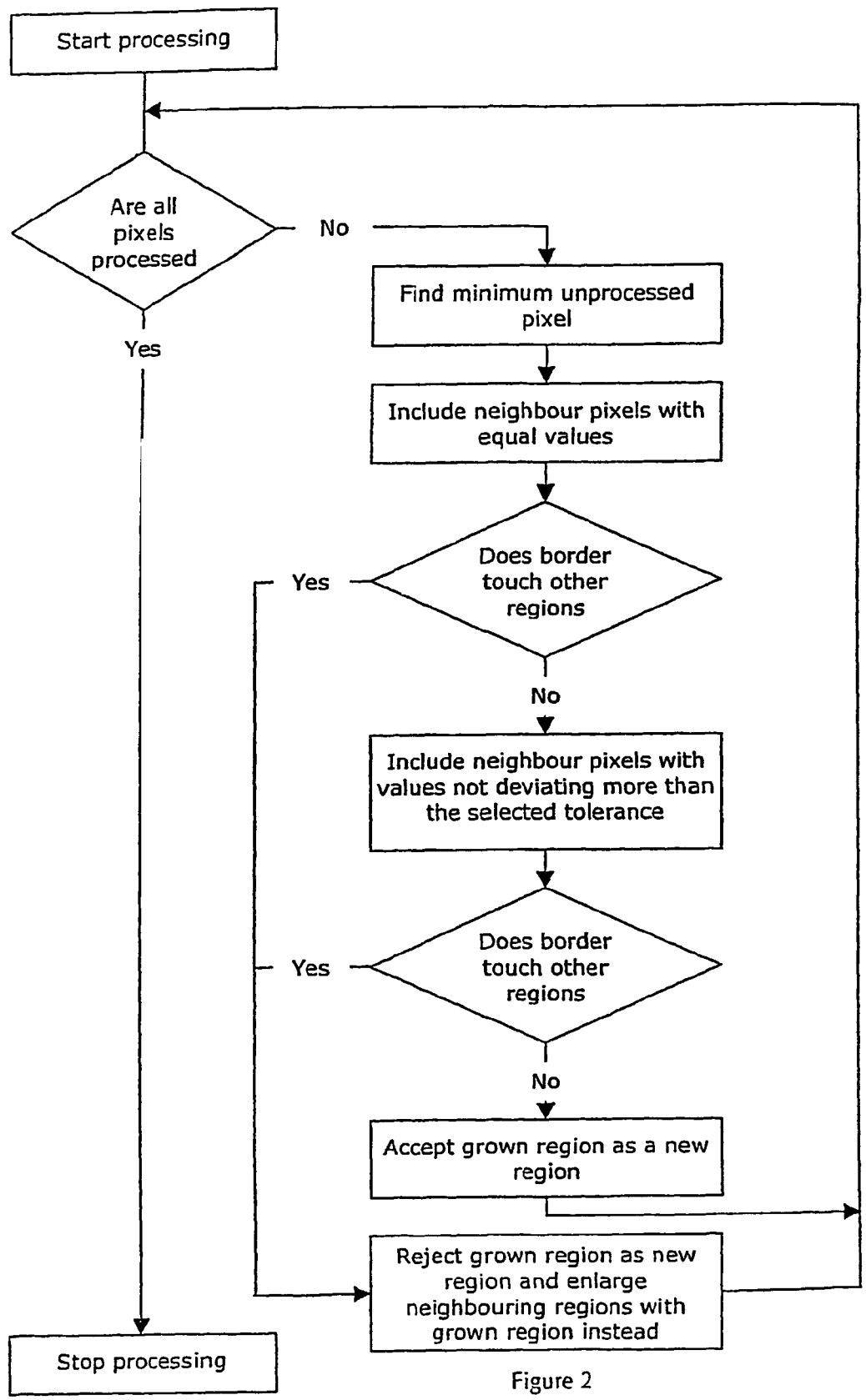
Figure 3:
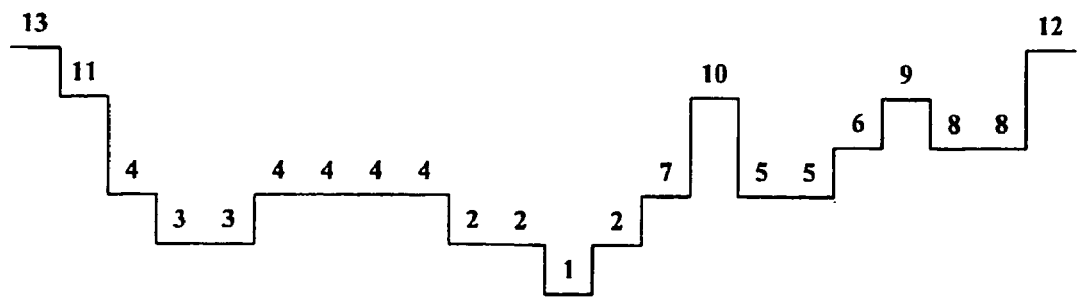
Figure 4:
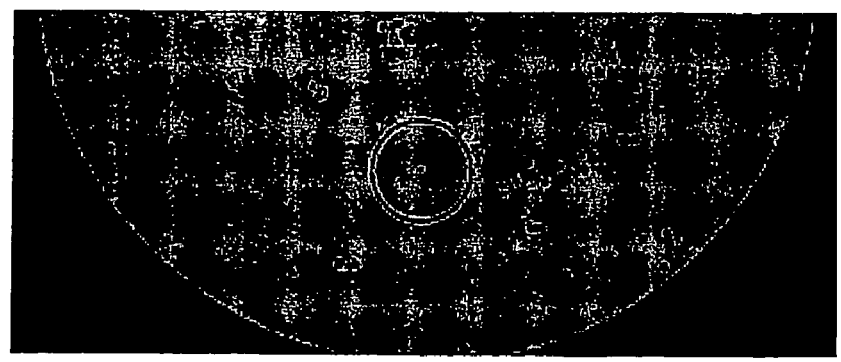
Figure 5:
Figure 6:
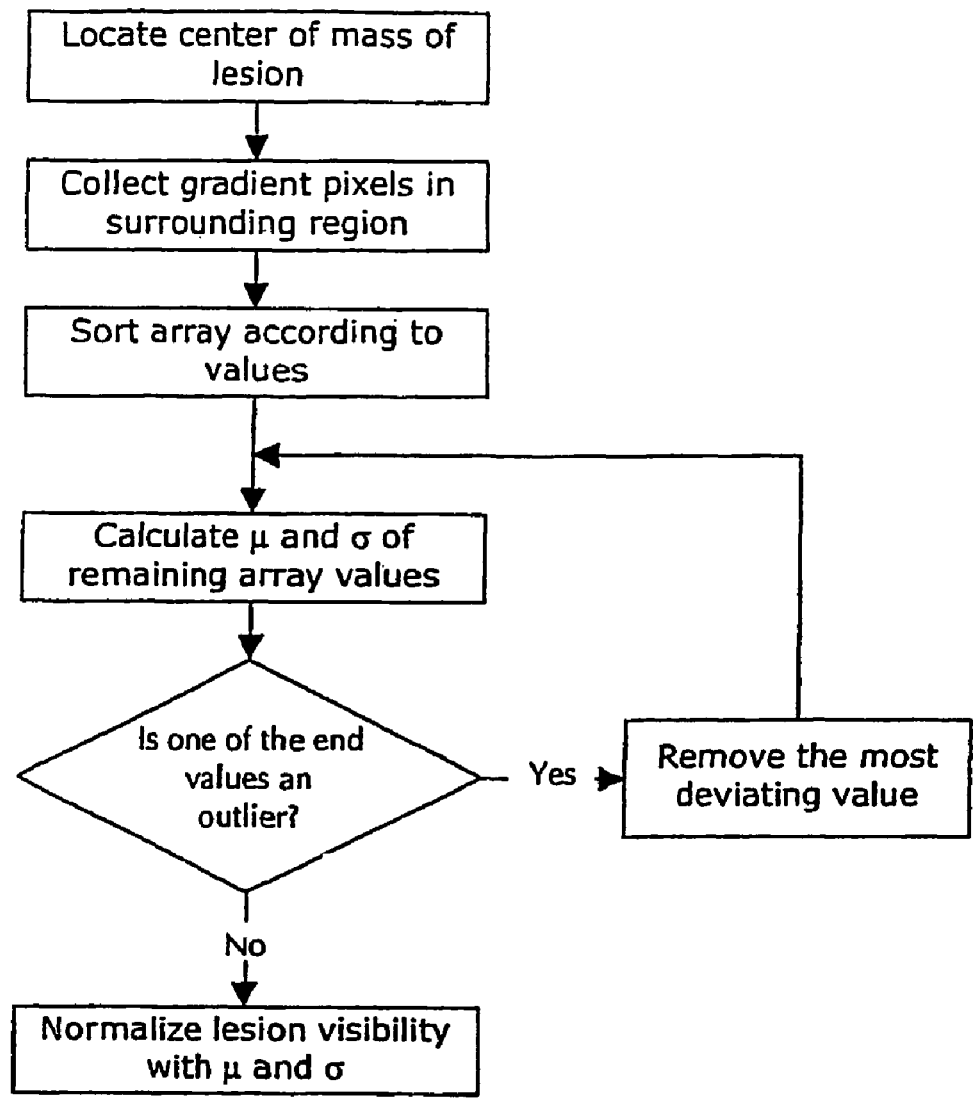
Figure 7:
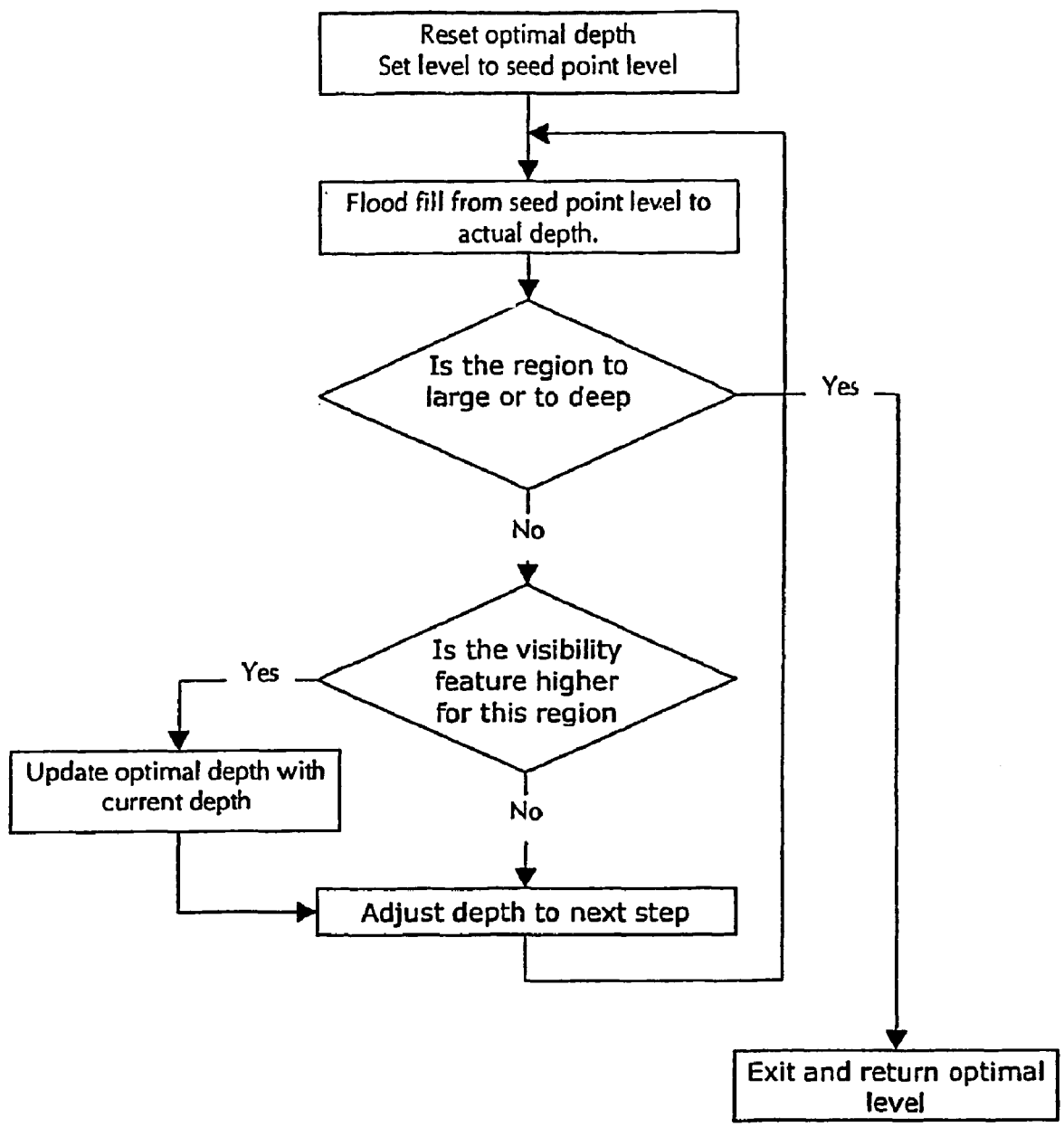

FIG. 1: Fundus image.
FIG. 2: A flowchart showing the Watershed procedure.
FIG. 3: 1-D example of pixel to process using Watershed algorithm with a tolerance of 1.
FIG. 4: The figure shows a partial image of the eye fundus, wherein a circle showing the 75 pixels radius background region of a lesion is arranged.
FIG. 5: The background region in the gradient image.
FIG. 6: Flow chart for normalization process.
FIG. 7: Flow chart for growing process.

Figure 8:
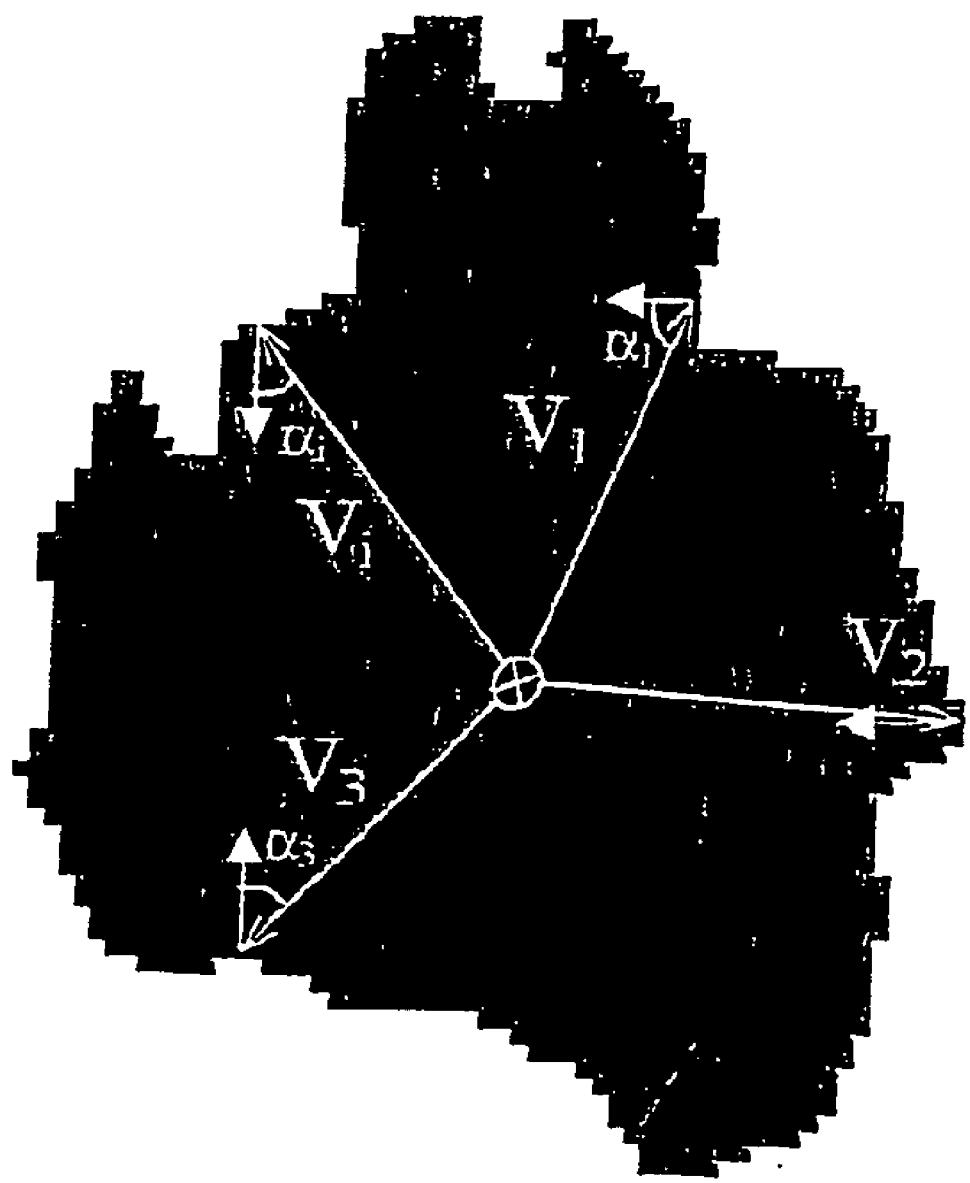

FIG. 8: Schematic drawing showing the calculation of the visibility feature.

Figure 9:
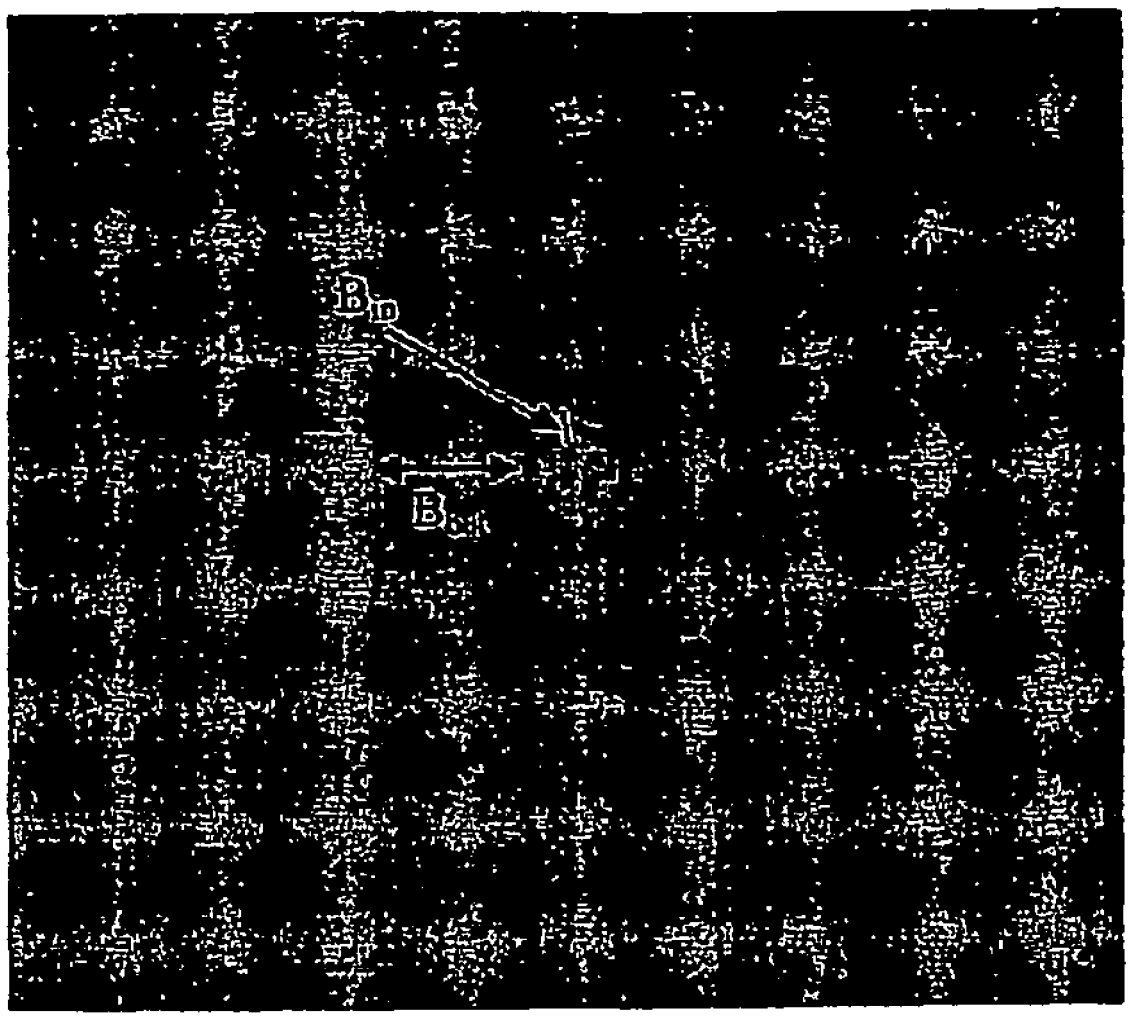

FIG. 9: An example of a grown lesion and the band around it representing the background.

Figure 10:

FIG. 10: An example of overlapping regions. The left panel displays the three regions which are grown from seed points located in the proliferation displayed in the right panel. The band around the largest grown region is used as background for all of the three regions.

DEFINITIONS

Fovea: The term is used in its normal anatomical meaning, i.e. the spot in retina having a great concentration of rods giving rise to the vision. Fovea and the term "macula lutea" are used as synonyms.

Image: The term image is used to describe a representation of the region to be examined, i.e. the term image includes 1-dimensional representations, 2-dimensional representations, 3-dimensionals representations as well as n-dimensional representatives. Thus, the term image includes a volume of the region, a matrix of the region as well as an array of information of the region.

Lesion in fundus images: Any pathology present in the fundus, such as microaneurysms, exudates, hemorrhages, cotton wool spot. Preferably, lesions refer to the dot-shaped lesions: micro-aneurysms and exudates.

Optic nerve head: The term is used in its normal anatomical meaning, i.e. the area in the fundus of the eye where the optic nerve enters the retina. Synonyms for the area are, for example, the "blind" spot, the papilla, or the optic disc.

Red-green-blue image: The term relates to the image having the red channel, the green channel and the blue channel, also called the RBG image.

ROI: Region of interest.

Starting point: The term describes a point or area for starting the search for a subset. The term starting point is thus not limited to a mathematical point, such as not limited to a pixel, but merely denotes a localisation for starting search.

Visibility: The term visibility is used in the normal meaning of the word, i.e. how visible a lesion or a structure of the fundus region is compared to background and other structures/lesions.

DETAILED DESCRIPTION OF THE INVENTION

Images

The images of the present invention may be any sort of images and presentations of the region of interest. Fundus image is a conventional tool for examining retina and may be recorded on any suitable means. In one embodiment the image is presented on a medium selected from dias, paper photos or digital photos. However, the image may be any other kind of representation, such as a presentation on an array of elements, for example a CCD.

The image may be a grey-toned image or a colour image; in a preferred embodiment the image is a colour image.

Subsets

At least one subset is established in the image, wherein the subset is a candidate lesion area. The term subset is used in its normal meaning, i.e. one or more pixels.

The subset may be detected established by any suitable method, for example by filtering, by template matching, by establishing starting points, and from said starting points grow regions and/or by other methods search for candidate areas, and/or combinations thereof. In one embodiment, the candidate lesion area(s) are detected by establishing starting points, and from the starting points estimating the subset. Two or more subsets, each representing the same lesion may be detected, such as overlapping subsets or adjacent subsets.

In a preferred embodiment the subset is a connected subset, i.e. all the pixels of the subset connects at least one of the other pixels, and it is possible to reach any of the pixels from any of the pixels by following pixels in the subset. In yet a preferred embodiment the estimation of the subset of the image comprises establishing of the periphery of the subset. The periphery may be established for example by active contour model (snake) (reference "Snakes: Active contour models" by M. Kass, A. Witkin and D. Terzopoulos), by templating or by growing.

Establishing Starting Points

Starting points may be established by a variety of suitable methods and of combinations of such methods. The variability of fundus images is particularly relevant regarding image dynamics; the contrast may vary considerably from image to image and even from region to region in the same fundus image. A proper starting point algorithm should recognize this circumstance and seek to adapt its sensitivity to the image at hand. The image may be filtered and/or blurred before establishing or as a part of establishing starting points for the method. For example the low frequencies of the image may be removed before establishing starting points. Also, the image may be unsharp filtered, for example by median or mean filtering the image and subtracting the filtered result from the image.

Independent of whether the image is filtered or not the starting points may be established as extrema of the image, such as local extrema. Preferably the image is however a filtered image, wherein the filtering may be linear and/or non-linear. Depending on the type of lesions assessed, the extrema may be minima or maxima or both, In one embodiment the filtering method is a template matching method, wherein the template may exhibit any suitable geometry for identifying the lesions. Examples of templates are circles, wherein the circles have a radius set as a ratio of the expected diameter of the optic nerve head.

It is within the scope of the invention, that the image may be filtered with one or more filters before establishing starting points, or as a part of the step of establishing starting points. Thus, in one embodiment of the invention starting points are established by combining two or more filters.

The extrema may thus be identified indidually by one or more of several methods, such as the following:

The lesions are normally either dark areas or light areas in the image, or at least locally the darkest areas or the lightest areas. Thus, a method may be establishing at least one intensity extremum in the image, preferably at least one intensity minimum or at least one intensity maximum. Therefore, in a preferred embodiment at least one local intensity maximum is established. The extrema may be established on any image function, such as wherein the image function is the unsharped image, the red channel image, the green channel image, or any combinations thereof. In a preferred embodiment the image function is the green channel.

Instead of using intensity or in addition to using intensity the method may include establishing at least one variance extremum in the image, preferably establishing at least one variance maximum in the image. For the same reasons as described with respect to the intensity at least one local variance maximum is established. The extrema may be established on any image function, such as wherein the image function is the unsharped image, the red channel image, the green channel image, or any combinations thereof. In a preferred embodiment the image function is the green channel.

Another method for establishing starting points may be random establishment of starting points, wherein the ultimative random establishment is establishing a starting point in substantially each pixel of the image. Of course a random establishment may be combined with any of the methods discussed above.

In yet a further embodiment the starting points may be established as grid points, such as evenly distributed or unevenly distributed grid points. Again this method may be combined with any of the methods of establishing extrema in the image and/or random establishment.

In a preferred method starting points are established by more than one of the methods described in order to increase the propability of assessing the correct localisation of lesions, if present, also with respect to images having less optimal illumination or presenting other forms of less optimal image quality. A problem that increases when fundus images are recorded decentrally and by less experienced staff than what is the case at specialised hospital departments.

In a more preferred embodiment the starting points are established by localising the local minima and/or maxima of the green channel image function, and let them act as starting points.

Growing

In a preferred embodiment the subset is established by growing a subset from a starting point. The growing of an object is used to segment an object form the background. The method may be used to grow both dark and bright objects, the algorithm for the one simply being an inversion of the algorithm of the other. The most essential part of the growing method is to limit the object with respect to the background. This limitation may be done in any way, for example by examining the visibility feature as described below, for a wide range of isocurves, or object depth, and then simply select the depth, which results in the highest possible visibility feature.

Thus, in this embodiment the establishment of subsets may be explained as growing q isocurves based on at least one growing feature of the area around the starting point, q being an integer of at least 1, until the periphery of the candidate lesion area is established. That is for each starting point, a number of isocurves, wherein each isocurve may represent a candidate lesion area, is grown from the starting point. By other words, the growing process may give rise to extraction of mom that one subset, the number of subsets for example corresponding to equally distant isocurves. Preferably the smallest subset exceeds that of the starting point itself, and the area of the largest subset subceeds a predetermined value. However, normally only one of the isocurves establishes the periphery of the lesion, said isocurve being the isocurve having the highest propability of being a candidate lesion area. The propability may for example be the highest visibility as described below. The subset of the image then implies the region contained by an isocurve resulting from the growing process, and the isocurve itself implies the periphery of the subset.

The growing algorithm is initialized in the starting point for the subset. Increasing the height in equidistant levels results in a number of grown isocurves. The step depth may be arbitrarily set, but is normally for practical reasons chosen to 1, as the pixel levels origins from byte images, which has discrete integer values. In principle the algorithm may continue for the whole image starting from each starting point. However, again for practical reasons and because the lesions assessed in the image are known to have certain normal ranges of size, it is appropriate to apply at least one limitation to the growing, namely that candidate lesion areas above a certain predetermined area is not allowed. Furthermore, another limitation may be applied either additionally or alone, namely that the candidate lesion is limited by a minimum and a maximum number of isocurves.

The predetermined value described above is preferably in the range of from 0.1 to 1.0, such as in the range of from 0.2 to 0.8, such as in the range of from 0.3 to 0.6.

The growing procedure is shown by means of a flow chart in FIG. 7.

In particular growing by use of watershed methods may be applied in the present invention. The watershed algorithm was introduced for the purpose of segmentation by Lantuejoul and Beucher. The idea of watershed is drawn by considering an image as a topographic surface. The image intensity (the gray level) is considered as an altitude with this point of view. A regional minimum is a connected plateau from which it is impossible to reach a point of lower gray level by an always-descending path. As the image surface is immerged, some of the flood areas (catchments basins) will tend to merge. When two or more different flood areas are touched, infinitely tall dams (watershed lines) are constructed between them. When finished, the resulting networks of dams define the watershed of the image. In other words, the watershed lines partitions the image into nonintersecting patches, called catchments basins. Since each patch contains only one regional minimum, the number of patches is equal to the number of the regional minima in the image.

In a preferred embodiment the pixel, with minimum value and which is closest to the center of mass of the region, becomes the origin for the growing algorithm.

An example of the process of growing is shown in the flow chart of FIG. 2. The shown processing steps are described by the previously shown flowchart with respect to FIG. 3.

Steps 1, 3, 5 and 8:

Find minimum unprocessed pixel, and include neighbour pixel with the same value. Borders are not touching other regions.

Steps 2 and 6:

Include neighbor pixels not deviating more than tolerance from the starting pixel. Borders are not touching other regions so assign new region.

Steps 4 and 9:

Include neighbor pixels not deviating more than tolerance from the starting pixel. Borders are touching other regions so enlarge those.

Steps 7, 10, 11, 12 and 13:

Find minimum unprocessed pixel, and include neighbor pixel with the same value. Borders are touching other regions so enlarge those.

The sensitivity of the watershed algorithm may be adjusted by modifying the tolerance level, which makes it possible to except basis with an insignificant depth.

After having established the periphery of the candidate lesion area, the area may be filled, for example by simply performing a flood fill from the starting point to the periphery.

Visibility

The term visibility is used in the normal meaning of the word, i.e. how visible a lesion or a structure of the fundus region is compared to background and other structures/lesions. The visibility of an area may be determined as a vector of features, including intensity, visibility of the candidate lesion compared to the visibility of the vessels, visibility of the edge of the candidate lesion, colour information of the candidate lesion, variance measure of a part of the image and/or a variance measure of the image. In a preferred embodiment the visibility of the edge of the candidate lesion calculated as the orientated candidate lesion area edge gradient, in particular a weighted edge gradient.

Thus, the visibility feature may be based on a summation of orientation weighted region border gradient pixels. In particular the gradient pixels should be weighted according to their orientation, $\alpha$, towards the grown region for example by applying the following formula to the candidate lesion area:

$$\text{Visibility} = \frac{1}{N}\sum_{i=1}^{N} V_i$$

$$V_i = c(\alpha_i) \cdot \|\nabla(Intensity_i)\|$$

$$c(\alpha_i) = \begin{cases} \cos(\alpha_i), & |\alpha_i| \leq \frac{\Pi}{2} \\ -1, & \text{else} \end{cases}$$

where N is the number of pixels in the outline of the lesion. Let $r_i$ be the vector between the center of mass of the lesion and the image point at $V_i$ $\alpha_1$ is then the angle between $r_i$ and orientation at the point.

Examples of the Vectors are Shown in FIG. 8.

The visibility feature may also be calculated from an image wherein the vessels have been "removed". This is done by subtracting the vessel image V(r,c). from the original image I(r,c), and producing a vessel "restored" image, i.e. an image wherein interpolated background values have been introduced instead of vessels, by $$I_{VRes}(r, c) = \begin{cases} B(r, c, w(r, c)) & hvis\ V(r, c) = 1 \\ I(r, c) & hvis\ V(r, c) = 0 \end{cases}.$$

The interpolated value may be produced by $$B(r, c, w) = \frac{\sum_{(r',c')} I(r', c')(1 - V(r', c'))h(\|(r, c) - (r', c')\|/w)}{\sum_{(r',c')} (1 - V(r', c'))h(\|(r, c) - (r', c')\|/w)},$$

where $h(x)=\exp(-x^2/2)$. The kernel breadth w(r,c) is set to the distance from pixel (r,c) to the closest background pixel. By the same principle, other features in the image may be "removed". This "removal" is conducted to avoid false positive lesions in proximity to features such as vessels.

Validating Subsets

The subsets may be validated before being corrected with respect to the background. By validation is meant that each subset is subjected to a validation step to determine whether the candidate area should classify as a candidate lesion area before correcting with the background variation. The validation is preferably carried out by a feature different from the growing feature(s).

In one embodiment the validation step includes calculating the visibility of the candidate lesion area.

BACKGROUND VARIATION

One of the major problems in the detection of lesions in fundus images is the heavily varying backgrounds in which lesions are to be found. Some fundus areas have an almost constant background while some areas are extremely varying, e.g. areas with a visible nerve fiber layer or choroidal structures. According to one aspect of the invention, it has been found an advantage to correct, for example normalize, the visibility feature values obtained for each candidate lesion area according to a robust estimated background variation. The normalization procedure may be carried out in at least two steps, by estimating at least one subset of the image, whereby each subset is a candidate lesion area having a visibility, and after having assigned visibility features to the candidate lesion area estimating the background variation, and correcting the visibility of the candidate lesion area.

However, in many embodiments the estimation of the subsets and estimation of the background variation is conducted in one step for each subset.

Background variation may be estimated by any suitable measure, accordingly, the background variation may be selected from the spatial and/or distributional properties of the original image, or any transformation of this, such as a gradiant image, a curvature image or a Laplace image.

The spatial properties may for example be based on a Fourier transformation, co-occurrence matrix, and fractale dimension, and the distributional properties may be moments such as mean, variance skeewness or kurtosis.

The lesions may for example be described by a visibility feature as discussed above, which is based on the orientation weighted lesion border gradient observations, and in this embodiment it has been shown to be an advantage to normalize the lesions visibility feature with a mean and standard deviation estimate of the background gradient.

Thus, in a preferred embodiment the background variation is estimated by sequential identification of out-liers, for example by c1) estimating the mean and standard deviation of the gradient magnitude pixels of an area defined surrounding the candidate lesion area, determining a lower threshold or above an upper threshold for the gradient magnitude pixels, c2) iteratively removing an out-lying gradient magnitude pixel below a lower threshold or above an upper threshold, and re-estimating the mean and standard deviation of the remaining gradient magnitude pixels, determining a second lower and a second upper threshold for the gradient magnitude pixels, until no out-lying gradient magnitude pixels are found.

c3) estimating the background variation from the mean and standard deviation estimated in c2).

In this embodiment the upper and lower threshold is determined as a constant multiplied with the standard deviation, for example as the standard deviation multiplied with at least 2, such as at least 3, such as at least 4, such as at least 5 or such as at least 6. It is preferred that at most one pixel is removed in each iteration step c2)

The area defined surrounding the candidate lesion area may include or exclude the candidate lesion area itself. In a preferred embodiment the gradient magnitude pixels in step c1) include pixels from the candidate lesion area.

The area surrounding the candidate area is normally selected to be in the range of from 0.25 to 1.0 of the expected optic nerve head area, such as from 0.5 to 1.0 of the expected optic nerve head area, such as from 0.6 to 1.0 of the expected optic nerve head area. Normally such an area corresponds to a number of pixels in the range of from 100 to 100,000 pixels, such as in the range of from 400 to 64,000 pixels, such as in the range of from 1000 to 50,000 pixels, such as in the range of from 5,000 to 25,000 pixels.

A preferred method for estimating the background variation is described in the following, referring to the flow chart of FIG. 6:

The first step of the normalization is to estimate the background gradient of the lesion to correct. This estimation is done by an initial collection of the pixels within a given radius from the lesion center of mass. The amount of pixels is set in accordance with resolution of the image assessed. For most purposes the amount of pixels are set in a radius of from 50 to 100 pixels, vide for example FIG. 4.

Crossing vessels and/or other lesions could influence a gradient estimate of the background, which calls for a robust estimation of the gradient background. The background region in the gradient image is shown in FIG. 5, from which the inlcuence of crossing vessels and/or other lesions is clear.

An example of robust estimation is by continuously removing outliers. Therefore the gradient pixels in the defined background region are collected in an array, which is sorted according to their values. The mean and standard deviation of this array is then calculated. Now the value at each end of the array is compared to the calculated mean and standard deviation and in case the most deviating of the two is an outlier it is removed from the array.

After having removed that observation, the mean and standard deviation is recalculated, and the ends are checked again. This trimming continues until no more outliers are found. In this implementation we define an outlier as a value deviating more than two standard deviations from the mean.

After having estimated the robust mean and standard deviation of the lesion background, the lesion visibility may be normalized using the standard formula:

$$v = \frac{v - \mu_{Gradient}}{\sigma_{Gradient} + 1}$$

Other robust methods may be by filtering the image before collecting the intensities or by using robust estimators, such as the median instead of the mean and the mean absolute deviation instead of the standard deviation.

Once the background variation has been estimated, it is possible to correct the visibility of the candidate lesion area with the background variation, and compare the corrected visibility with a predetermined visibility threshold for lesions in that area, or correct a predetermined visibility threshold with the background variation, and compare the visibility of the candidate lesion area with the corrected predetermined visibility threshold. By any of these steps it is possible to assign a local threshold for lesions thereby increasing the specificity as well as the sensitivity of the methods for assessing the presence and/or absence of a lesion.

The candidate lesion area is after comparison to the threshold obtained in step b) classified as a lesion or not.

The steps of the methods may be conducted sequentially or in parallel for all subsets.

Some of the naturally occurring structures of the image may influence the assessment of lesions in a disadvantageous manner. Such structures are for example vessels, and the optic nerve head of a fundus image, since these structures present dark/bright areas in the image. Therefore, some adjustment to the structure is preferred.

Adjustment with Respect to Vessels

Various methods are known by which the vascular system may be isolated from the rest of the image content.

Another method for tracking vessels is a method wherein use is made of the fact that the vessels are linear in a local neighbourhood wherein different filter matrices have different orientations. The localisation and orientation of such line elements may be determined using a template matching approach sometimes referred to as match filters).

Other methods for tracking vessels known to the person skilled in the art may be found in Subhasis Chaudhuri et al, "Detection of Blood Vessels in Retinal Images Using Two-Dimensional Matched Filters", IEEE Transactions on Medical Imaging, Vol. 8, No. 3, September 1989.

Tolias y a et al "A fuzzy vessel tracking algorithm for retinal images based on fuzzy clustering, IEEE Transactions on Medical Imaging, April 1998, IEEE; USA vol. 17, No. 2, pages 263-273, ISSN: 0278-0062

Akita et al: "A computer method of understanding ocular fundus images" Pattern Recognition, 1982, UK, vol. 15, No. 6, pages 431-443, ISSN: 0031-3203 chapter 4.

A preferred method for tracking vessels is by tracking individual vessels from starting points representative for vessels, and iteratively grow the vessel network of the retina. A preferred embodiment hereof is described in a co-pending PCT patent application entitled "Vessel tracking" of RETINALYZE A/S.

In some of the embodiments according to the invention, it is preferred that the estimation of starting points and/or estimation of subsets is adjusted with respect to vessels appearing in the image. For many of these embodiments it is even more preferred that the estimation of candidate lesion areas is preceded by detection of vessels in the image.

In one embodiment adjustment of starting points means that starting points located in vessels are removed from the plurality of starting points representative for a lesion. In another embodiment subsets of the image having at least a portion of said subset located in a vessel are rejected as a candidate lesion area.

Yet another method for adjusting with respect to the vessels is having detected the vessels of the image, the vessels appearing in the image are masked before establishing starting points. The vessels may be masked by any suitable method, for example by masking a number of pixels along the vessel, such as a number in the range of from 1 to 10 pixels.

Having identified the blood vessels in the image, it may be desirable to be able to distinguish between veins and arteries among the blood vessels. This can be important, for example in the diagnosis of venous beading and focal arteriolar narrowing.

The vascular system observed in the ocular fundus images is by nature a 2-dimensional projection of a 3-dimensional structure. It is quite difficult in principle to distinguish veins from arteries, solely by looking at isolated vessel segments. However, it has been discovered that effective separation can be achieved by making use of the fact that, individually, the artery structure and the vein vessel structures is each a perfect tree, (i. e., there is one unique path along the vessels from the heart to each capillary and back).

On the retina, the artery and vein structures are each surface filling, so that all tissue is either supplied or drained by specific arteries or veins, respectively.

A method for distinguishing veins from arteries is described in WO 00/65982 to Torsana Diabetes Diagnostic A/S, which is based on the realisation that crossings of vessel segments are, for practical purposes, always between a vein and an artery (i.e. crossings between arteries and arteries or between veins and veins are, for practical purposes, non-existent).

Masking Optic Nerve Head

Another structure capable of interfering with the assessment of lesions is the optic nerve head. As opposed to vessels, the optic nerve head is not necessarily present in all images, this depending on the region acquired by the camera or CCD.

Thus, in a preferred method the presence or absence of the optic nerve head area is assessed by a robust method before assessing the lesions. Such a method is for example described in a co-pending PCT patent application entitled "Detection of optic nerve head in a fundus image" by RETINALYZE A/S.

In some of the embodiments according to the invention, it is preferred that the estimation of starting points and/or estimation of subsets is adjusted with respect to the optic nerve head appearing in the image. For many of these embodiments, it is even more preferred that the estimation of candidate lesion areas is preceded by detection of the optic nerve head in the image.

In one embodiment adjustment of starting points means that starting points located in the optic nerve head are removed from the plurality of starting points representative for a lesion. In another embodiment subsets of the image having at least a portion of said subset located in the optic nerve head are rejected as a candidate lesion area.

Yet another method for adjusting with respect to the optic nerve head is, when having detected the optic nerve head of the image, the optic nerve head appearing in the image is masked before establishing starting points. The optic nerve head may be masked by any suitable method, for example by masking a number of pixels around the optic nerve head, such as a number corresponding to a constant multiplied with the diameter of the optic nerve head, optionally of an expected diameter of the optic nerve head, said constant being in the range of from 1.1 to 2.0, preferably about 1.5.

In a further embodiment the method according to the present includes weighting the visibility in relation to local intensity variation around the lesion in order to reduce false positive lesions due to for example nerve fibre layers, untracked vessels and reflections in the vitreous body. A common feature of these false positives is that the local intensity variation around the lesion is relatively large, contrary to the majority of true lesions, which are located in homogenous areas.

When two grown lesions are overlapping, one must be embedded in the other, as the iso-intensity curves defining the edges of the lesions cannot cross. In this case, the background may be defined slightly differently, in order to avoid that the large lesion is interpreted as background when evaluating the smaller interior lesion.

When considering overlapping lesions, the "foreground" may be the entire connected component in the les-image consisting of positive visibility pixels. The background will be defined as above, but relative to this foreground-region. Thus, all lesions that are overlapping will have the same background region. The principle is illustrated in FIG. 10.

If the background is not defined in this way, regions grown around fovea and in large lesions may be misclassified as these usually have overlapping grown regions.

Therefore, it is preferred that the visibility is weighted with a measure for the homogenicity of the local background. The local or immediate background may be defined as the band of pixels that are more than $B_{in}$ and at most $B_{in}+B_{out}$ pixels from the lesion. The distance between a point and the lesion is defined as the smallest distance between the point and a pixel within the lesion. Thus $B_{out}$ is the width of the background-band around the lesion, and $B_{in}$ is the width of the band separating the lesion and the background. The principle is illustrated by the front-page figure and in FIG. 9. The parameters $B_{in}$ and $B_{out}$ should be scaled with the image scale.

Pixels may be excluded from the background if they are located either

1. On a tracked vessel,
2. Outside the ROI,
3. Closer than $B_{in}$ to another lesion, which has visibility more than $Tv$, where v is the visibility of the current lesion, and T is a tolerance parameter.

The rationale behind excluding pixels due to the first and second criteria should be clear. The $3^{rd}$ criteria is employed to avoid that true lesions, which are located close together, influence each others backgrounds, and the parameter T may be used to govern the tolerance of this restriction. It has been found that setting T=0 is significantly better than when the criteria is not used at all (corresponding to T=∞); by choosing a value of T around 1.0 it is avoided that lesions with small visibility are removed from the background band, which seems to be most sensible in practice.

In one embodiment the ratio of the mean green channel intensity in the background and in the lesion may be used to discriminate true and false lesions. For example, a fixed threshold seems most appropriate, $$\frac{\mu_{green,out}}{\mu_{green,in}} > IR_{thresh}$$

where $IR_{thresh}$ preferably is less than 1.1 such as between 1.01 and 1.09, preferably between 1.04 and 1.08 to discriminate a true lesion from a false lesion, a false lesion having mean intensity ration below $IR_{tresh}$. Here $\mu_{green,out}$ and $\mu_{green,in}$ is the mean of the green channel in the immediate background and in the lesion, respectively.

In another embodiment the variance measure of a part of the image is estimated by c4) defining a band of pixels of a predetermined width and being at a predetermined distance from the candidate lesion area, c5) estimating the mean and standard deviation of the intensity of the band, and c6) estimating the variance measure of a part of image from the mean and standard deviation estimated in c5.

This may be exemplified by ratio of the standard deviation in the background and in the lesion is used to detect typical false positive lesions, namely those located in vessels and near reflections. It has been found that a variance-weighted visibility measure is indeed a useful approach, $$\tilde{v} = v \left( \frac{\sigma^2_{poly,out}}{\sigma^2_{poly,in}} \right)^{-1/2}.$$

Here v is the usual normalised visibility measure, and $\sigma^2_{poly,in}$ respectively $\sigma^2_{poly,out}$ is the variance of the intensities in the poly-smoothed image inside the lesion and in the background, respectively.

The variance-weighted visibility measure is then compared with the predetermined visibility threshold as described above. In a preferred embodiment it is the corrected visibility that is weighted as described above or the weighted visibility is compared with the corrected threshold.

Applications

In the following examples of various applications of the method according to the invention are discussed.

Once the presence or absence of lesions has been assessed, the information regarding the lesion may be used for various purposes.

Accordingly, the present invention further relates to a method for diagnosing the presence or absence of a disease in an individual from a fundus image of at least one eye of said individual comprising assessing the presence or absence of at least one lesion by the method as defined above, grading the fundus image with respect to number and/or size and/or placement of lesions, diagnosing the presence or absence of the disease.

In particular this method relates to the diagnosis and prognosis of diabetic retinopathy.

In another aspect the invention relates to a method for classifying a fundus image comprising assessing the presence or absence of at least one lesion by the method as defined above, grading the fundus image with respect to number and/or size and/or placement of lesions, classifying the fundus image into at least two classes.

Normally several classes are used, wherein the images are graded both with respect to the number of lesions, and to the distance of the lesions to fovea.

System

In another aspect the invention further relates to a system for assessing the presence or absence of lesions in a fundus image. Thus, the system according to the invention may be any system capable of conducting the method as described above as well as any combinations thereof within the scope of the invention. Accordingly, the system may include algorithms to perform any of the methods described above.

A graphical user interface module may operate in conjunction with a display screen of a display monitor. The graphical user interface may be implemented as part of the processing system to receive input data and commands from a conventional keyboard and mouse through an interface and display results on a display monitor. For simplicity of the explanation, many components of a conventional computer system have not been discussed such as address buffers, memory buffers, and other standard control circuits because these elements are well known in the art and a detailed description thereof is not necessary for understanding the present invention.

Pre-acquired image data can be fed directly into the processing system through a network interface and stored locally on a mass storage device and/or in a memory. Furthermore, image data may also be supplied over a network, through a portable mass storage medium such as a removable hard disk, optical disks, tape drives, or any other type of data transfer and/or storage devices which are known in the art.

One skilled in the art will recognize that a parallel computer platform having multiple processors is also a suitable hardware platform for use with a system according to the present invention. Such a configuration may include, but not be limited to, parallel machines and workstations with multiple processors. The processing system can be a single computer, or several computers can be connected through a communications network to create a logical processing system.

Any of the algorithms of the systems described above may be adapted to the various variations of the methods described above.

The present system allows the grader, that is the person normally grading the images, to identify the lesions more rapidly and securely. Also, the present system allows an automatic detection of lesions and other pathologies of the retina without interference from the vessels, again as an aiding tool for the traditional grader.

By use of the present system it is also possible to arrange for recordation of the images at one location and examining them at another location. For example the images may be recorded by any optician or physician or elsewhere and be transported to the examining specialist, either as photos or the like or on digital media. Accordingly, by use of the present system the need for decentral centers for recording the image, while the maintaining fewer expert graders could be realised.

Furthermore, in addition to the communication of images and medical information between persons involved in the procedure, the network may carry data signals including control or image adjustment signals by which the expert examining the images at the examining unit directly controls the image acquisition occurring at the recordation localisation, i.e. the acquisition unit. In particular, such command signals as zoom magnification, steering adjustments, and wavelength of field illumination may be selectively varied remotely to achieve desired imaging effect. Thus, questionable tissue structures requiring greater magnification or a different perspective for their elucidation may be quickly resolved without ambiguity by varying such control parameters. Furthermore, by switching illumination wavelengths views may be selectively taken to represent different layers of tissue, or to accentuate imaging of the vasculature and blood flow characteristics. In addition, where a specialized study such as fluorescence imaging is undertaken, the control signals may include time varying signals to initiate stimulation with certain wavelengths of light, to initiate imaging at certain times after stimulation or delivery of dye or drugs, or other such precisely controlled imaging protocols. The digital data signals for these operations may be interfaced to the ophthalmic equipment in a relatively straightforward fashion, provided such equipment already has initiating switches or internal digital circuitry for controlling the particular parameters involved, or is capable of readily adapting electric controls to such control parameters as system focus, illumination and the like.

Also, the examining expert could be able to exert some treatment in the same remote manner. It will be understood that the imaging and ophthalmic treatment instrumentation in this case will generally include a steering and stabilization system which maintains both instruments in alignment and stabilized on the structures appearing in the field of view. However, in view of the small but non-negligible time delays still involved between image acquisition and initiation of diagnostic or treatment activity at the examination site, in this aspect of the invention, the invention contemplates that the system control further includes image identification and correlation software which allows the ophthalmologist at site to identify particular positions in the retinal field of view, such as pinpointing particular vessels or tissue structures, and the image acquisition computer includes image recognition software which enables it to identify patterns in the video frames and correlate the identified position with each image frame as it is acquired at the acquisition site. For example, the image recognition software may lock onto a pattern of retinal vessels. Thus, despite the presence of saccades and other abrupt eye movements of the small retinal field which may occur over relatively brief time intervals, the ophthalmic instrumentation is aimed at the identified site in the field of view and remote treatment is achieved.

In addition to the foregoing operation, the invention further contemplates that the images provided by acquisition unit are processed for photogrammetric analysis of tissue features and optionally blood flow characteristics. This may be accomplished as follows. An image acquired at the recordation unit is sent to an examination unit, where it is displayed on the screen. As indicated schematically in the figure, such image may include a network of blood vessels having various diameters and lengths. These vessels include both arterial and venous capillaries constituting the blood supply and return network. At the examination unit, the workstation may be equipped with a photogrammetric measurement program which for example may enable the technician to place a cursor on an imaged vessel, and moving the cursor along the vessel while clicking, have the software automatically determine the width of the vessel and the subvessels to which it is connected, as well as the coordinates thereof.

The software for noting coordinates from the pixel positions and linking displayed features in a record, as well as submodules which determine vessel capacities and the like, are straightforward and readily built up from photogrammetric program techniques. Work station protocols may also be implemented to automatically map the vasculature as described above, or to compare two images taken at historically different times and identify or annotate the changes which have occurred, highlighting for the operator features such as vessel erosion, tissue which has changed colour, or other differences. In addition, a user graphical interface allows the specialist to type in diagnostic indications linked to the image, or to a particular feature appearing at a location in the image, so that the image or processed version of it becomes more useful.

Thus, a very precise and well-annotated medical record may be readily compiled and may be compared to a previously taken view for detailed evidence of changes over a period of time, or may be compared, for example, to immediately preceding angiographic views in order to assess the actual degree of blood flow occurring therein. As with the ophthalmologist's note pad entries at examination unit, the measurement entries at examination unit become an annotated image record and are stored in the central library as part of the patient's record.

Unlike a simple medical record system, the present invention changes the dynamics of patient access to care, and the efficiency of delivery of ophthalmic expertise in a manner that solves an enormous current health care dilemma, namely, the obstacle to proper universal screening for diabetic retinopathy. A basic embodiment of the invention being thus disclosed and described, further variations and modifications will occur to those skilled in the art, and all such variations and modifications are encompassed within the scope of the invention as defined in the claims appended hereto.

The invention claimed is:

1. A method for assessing the presence or absence of lesion(s) in an image, comprising
    a) estimating, using at least one computer, at least one subset of the image, whereby each subset is a candidate lesion area having a visibility, and estimating the background variation of the image in an area surrounding the candidate lesion area, wherein the background variation is estimated by
    a1) estimating the mean and standard derivation of the gradient magnitude pixels of an area defined surrounding the candidate lesion area, determining a lower threshold or above an upper threshold for the gradient magnitude pixel,
    a2) iteratively removing an out-lying gradient magnitude pixel below a lower threshold or above an upper threshold, and re-estimating the mean and standard deviation of the remaining gradient magnitude pixels, determining a second lower and a second upper threshold for the gradient magnitude pixels, until no out-lying gradient magnitude pixels are found, and
    a3) estimating the background variation from the mean and standard deviation estimated in a2),
    b) correcting the visibility of the candidate lesion area with the background variation, comparing the corrected visibility with a predetermined visibility threshold for lesions in that area, or correcting a predetermined visibility threshold with the background variation, comparing the visibility of the candidate lesion area with the corrected predetermined visibility threshold,
    c) classifying the candidate lesion area detected in a) with respect to the threshold obtained in step b) and as a lesion or not,
    d) optionally repeating steps a) to c) until all candidate lesion areas have been classified.

2. The method of claim 1, wherein the image is an ocular fundus image.

3. The method according to claim 1, wherein the image is a colour image.

4. The method according to claim 1, wherein the green channel is used for assessing the presence or absence of lesion(s).

5. The method according to claim 1, wherein the subset(s) are estimated by establishing a plurality of starting points, said starting points being representative for lesions, and estimating each subset around a starting point.

6. The method according to claim 1, wherein the starting points are established in extremas of the image.

7. The method according to claim 1, wherein the subset of the image is a connected subset.

8. The method according to claim 1, wherein the subset of the image is estimated by filtering the image.

9. The method according to claim 1, wherein estimating the subset of the image comprises establishing the periphery of the subset.

10. The method according to claim 1, wherein the subset of the image is estimated by growing an area around the starting point.

11. The method according to claim 10, wherein q isocurves based on at least one growing feature of the area are grown around the starting point, q being an integer of at least 1, until the periphery of the candidate lesion area is established.

12. The method according to claim 11, wherein the visibility of the area within the isocurves is estimated, and the isocurve having the highest visibility establishes the periphery of the candidate lesion area.

13. The method according to claim 1, wherein the visibility of an area is determined as a vector of features including intensity, visibility of the candidate lesion compared to the visibility of the vessels, visibility of the edge of the candidate lesion, colour information of the candidate lesion, variance measure of a part of the image and/or a variance measure of the image.

14. The method according to claim 1, wherein the subset of the image is estimated by active contour model.

15. The method according to claim 5, wherein the identification of starting point is adjusted with respect to vessels appearing in the image.

16. The method according to claim 1, wherein the estimation of subset is adjusted with respect to vessels appearing in the image.

17. The method according to claim 1, wherein subsets of the image having at least a portion of said subset located in a vessel is rejected as a candidate lesion area.

18. The method according to claim 2, wherein the identification of starting point is adjusted with respect to optic nerve head appearing in the image.

19. The method according to claim 2, wherein subsets of the image having at least a portion of said subset located in the optic nerve head are rejected as a candidate lesion area.

20. The method according to claim 1, wherein the area surrounding the candidate lesion area excludes the candidate lesion area.

21. A method for assessing the presence or absence of lesion(s) in an image, comprising
   a) estimating, using at least one computer, at least one subset of the image, whereby each subset is a candidate lesion area having a visibility, and estimating the background variation of the image in an area surrounding the candidate lesion area, the visibility of an area is determined as a vector of features including variance measure of a part of the image, wherein the variance measure of a part of the image is estimated by
      a4) defining a band of pixels of a predetermined width and being at a predetermined distance from the candidate lesion area,
      a5) estimating the mean and standard deviation of the intensity of the band, and
      a6) estimating the variance measure of a part of image from the mean and standard deviation estimated in a5,
   b) correcting the visibility of the candidate lesion area with the background variation, comparing the corrected visibility with a predetermined visibility threshold for lesions in that area, or correcting a predetermined visibility threshold with the background variation, comparing the visibility of the candidate lesion area with the corrected predetermined visibility threshold,
   c) classifying the candidate lesion area detected in a) with respect to the threshold obtained in step b) and as a lesion or not,
   d) optionally repeating steps a) until all candidate lesion areas have been classified.

22. A method for assessing the presence or absence of lesion(s) in an image, comprising
   a) estimating, using at least one computer, at least one starting point representative for a lesion in the image,
   b) selecting at least one starting point, estimating a subset of the image corresponding to a candidate lesion by growing q isocurves around the starting point, q being an integer of at least 1, until the periphery of the candidate lesion is established, the isocurves being grown from a vector of one or more visibility features,
   c) determining the visibility of the candidate lesion area, the visibility being determined from a visibility feature different from the visibility features used for growing in step b), and comparing the visibility of the candidate lesion with a predetermined threshold, the visibility of an area is determined as a vector of features including variance measure of a part of the image, wherein the variance measure of a part of the image is estimated by
      c4) defining a band of pixels of a predetermined width and being at a predetermined distance from the candidate lesion area,
      c5) estimating the mean and standard deviation of the intensity of the band, and
      c6) estimating the variance measure of a part of image from the mean and standard deviation estimated in c5,
   d) classifying the candidate lesion area detected in a) with respect to the threshold obtained in step b) and as a lesion or not,
   e) optionally repeating steps b) to d) until all candidate lesion areas have been classified.

23. The method of claim 22, wherein the image is an ocular fundus image.

24. The method according to claim 22, wherein the image is a colour image.

25. The method according to claim 22, wherein the green channel is used for assessing the presence or absence of lesion(s).

26. The method according to claim 22, wherein the starting points established in extremas of the image.

27. The method according to claim 22, wherein the subset of the image is a continuous subset.

28. The method according to claim 22, wherein the subset of the image is estimated by filtering the image.

29. The method according to claim 28, wherein the visibility of the area within the isocurves is estimated, and the isocurve having the highest visibility establishes the periphery of the candidate lesion area.

30. The method according to claim 22, wherein the visibility of an area is determined as a vector of features including intensity, visibility of the candidate lesion compared the visibility of the vessels, visibility of the edge of the candidate lesion, colour information of the candidate lesion, variance measure of a part of the image and/or a variance measure of the image.

31. The method according to claim 22, further comprising correcting the visibility of the candidate lesion area with the background variation, comparing the corrected visibility with a predetermined visibility threshold for lesions in that area, or correcting a predetermined visibility threshold with the background variation, comparing the visibility of the candidate lesion area with the corrected predetermined visibility threshold, classifying the candidate lesion area detected with respect to the threshold obtained as a lesion or not.

32. The method according to claim 22, wherein the identification of starting point is adjusted with respect to vessels appearing in the image.

33. The method according to claim 22, wherein starting points located in vessels are removed from the plurality of starting points representative for a lesion.

34. The method according to claim 23, wherein the identification of starting point is adjusted with respect to optic nerve head appearing in the image.

35. A method for diagnosing the presence or absence of a disease in an individual from a fundus image of at least one eye of said individual comprising
   assessing the presence or absence of at least one lesion by the method as defined in claim 1, grading the fundus image with respect to number and/or size of lesions, diagnosing the presence or absence of the disease.

36. The method according to claim 35, wherein the disease is diabetic retinopathy.

37. A method for classifying a fundus image comprising assessing the presence or absence of at least one lesion by the method as defined in claim 1, grading the fundus image with respect to number and/or size of lesions, classifying the fundus image into at least two classes.

38. A system for assessing the presence or absence of lesion(s) in an image, comprising
   a) an algorithm for estimating at least one subset of the image, whereby each subset is a candidate lesion area having a visibility, and estimating the background variation of the image in an area surrounding the candidate lesion area, wherein the background variations is estimated by
   a1) estimating the mean and standard deviation of the gradient magnitude pixels of an area defined surrounding the candidate lesion area, determining a lower threshold or above an upper threshold for the gradient magnitude pixels,
   a2) iteratively removing an out-lying gradient magnitude pixel below a lower threshold or above an upper threshold, and re-estimating the mean and standard deviation of the remaining gradient magnitude pixels, determining a second lower and a second upper threshold for the gradient magnitude pixels, until no out-lying gradient magnitude pixels are found, and
   a3) estimating the background variation from the mean and standard deviation estimated in a2),
   b) an algorithm for correcting the visibility of the candidate lesion area with the background variation, comparing the corrected visibility with a predetermined visibility threshold for lesions in that area, or correcting a predetermined visibility threshold with the background variation, comparing the visibility of the candidate lesion area with the corrected predetermined visibility threshold,
   c) an algorithm for classifying the candidate lesion area detected in a) with respect to the threshold obtained in step b) as a lesion or not,
   d) an algorithm for optionally repeating steps a) to c) until all candidate lesion areas have been classified, and at least one computer for implementing the algorithms.

39. A system for assessing the presence or absence of lesion(s) in an image, comprising
   a) an algorithm for establishing at least one starting point representative for a lesion in the image,
   b) an algorithm for selecting at least one starting point, estimating a subset of the image corresponding to a candidate lesion by growing q isocurves around the starting point, q being an integer of at least 1, until the periphery of the candidate lesion is established, the isocurves being grown from a vector of one or more visibility features,
   c) an algorithm for determining the visibility of the candidate lesion area, the visibility being determined from a visibility feature different from the visibility features used for growing in step b), and comparing the visibility of the candidate lesion with a predetermined threshold, the visibility of an area is determined as a vector of features including variance measure of a part of the image, wherein the variance measure of a part of the image is estimated by
   c4) defining a band of pixels of a predetermined width and being at a predetermined distance from the candidate lesion area,
   c5) estimating the mean and standard deviation of the intensity of the band, and
   c6) estimating the variance measure of a part image from the mean and standard deviation estimated in c5,
   d) an algorithm for classifying the candidate lesion area detected in a) with respect to the threshold obtained in step b) as a lesion or not,
   e) an algorithm for and optionally repeating steps b) to d) until all candidate lesion areas have been classified, and at least one computer for implementing the algorithms.

40. A method for diagnosing the presence or absence of a disease in an individual from a fundus image of at least one eye of said individual comprising assessing the presence or absence of at least one lesion by the method as defined in claim 22, grading the fundus image with respect to number and/or size of lesions, diagnosing the presence or absence of the disease.

41. The method according to claim 40, wherein the disease is diabetic retinopathy.

* * * * *

UNITED STATES PATENT AND TRADEMARK OFFICE
CERTIFICATE OF CORRECTION

| | | |
|---|---|---|
| PATENT NO. | : 7,583,827 B2 | Page 1 of 1 |
| APPLICATION NO. | : 10/491746 | |
| DATED | : September 1, 2009 | |
| INVENTOR(S) | : Hansen et al. | |

It is certified that error appears in the above-identified patent and that said Letters Patent is hereby corrected as shown below:

On the cover page,

Item [*] Notice: Subject to any disclaimer, the term of this patent is extended or adjusted under 35 USC 154(b) by 880 days Delete the phrase "by 880 days" and insert -- by 1389 days --

Signed and Sealed this

Eighth Day of June, 2010

David J. Kappos
*Director of the United States Patent and Trademark Office*

UNITED STATES PATENT AND TRADEMARK OFFICE
CERTIFICATE OF CORRECTION

PATENT NO. : 7,583,827 B2
APPLICATION NO. : 10/491746
DATED : September 1, 2009
INVENTOR(S) : Hansen et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1898 days.

Signed and Sealed this

Fourteenth Day of September, 2010

David J. Kappos
*Director of the United States Patent and Trademark Office*